United States Patent
Maruyama et al.

(10) Patent No.: US 8,570,700 B2
(45) Date of Patent: Oct. 29, 2013

(54) PROTECTION APPARATUS FOR LOAD CIRCUIT

(75) Inventors: Akinori Maruyama, Susono (JP); Yoshihide Nakamura, Susono (JP); Keisuke Ueta, Susono (JP)

(73) Assignee: Yazaki Corporation, Tokyo (JP)

( * ) Notice: Subject to any disclaimer, the term of this patent is extended or adjusted under 35 U.S.C. 154(b) by 380 days.

(21) Appl. No.: 12/997,385

(22) PCT Filed: Jun. 10, 2009

(86) PCT No.: PCT/JP2009/060634
§ 371 (c)(1),
(2), (4) Date: Dec. 10, 2010

(87) PCT Pub. No.: WO2009/151084
PCT Pub. Date: Dec. 17, 2009

(65) Prior Publication Data
US 2011/0080681 A1    Apr. 7, 2011

(30) Foreign Application Priority Data

Jun. 13, 2008    (JP) .................................. 2008-155437

(51) Int. Cl.
*H02H 5/04* (2006.01)
*H02G 3/20* (2006.01)
*H02H 9/04* (2006.01)
*H02H 9/08* (2006.01)

(52) U.S. Cl.
USPC .......... 361/93.8; 361/93.1; 361/93.9; 361/94; 361/101; 361/103; 361/104

(58) Field of Classification Search
USPC ......... 361/93.8, 93.1, 93.9, 94, 101, 103, 104
See application file for complete search history.

(56) References Cited

U.S. PATENT DOCUMENTS

| 7,050,281 B2 | 5/2006 | Ohta et al. |
| 7,640,080 B2 | 12/2009 | Nakamura et al. |
| 2007/0253132 A1* | 11/2007 | Nakamura et al. ............ 361/103 |
| 2010/0254059 A1 | 10/2010 | Higuchi et al. |

FOREIGN PATENT DOCUMENTS

| DE | 102006033044 | * | 1/2008 |
| JP | 6-289943 A | | 10/1994 |
| JP | 7-222345 A | | 8/1995 |
| JP | 10-285784 A | | 10/1998 |

(Continued)

OTHER PUBLICATIONS

International Search Report, dated Sep. 8, 2009, issued in application No. PCT/JP2009/060634.

(Continued)

*Primary Examiner* — Jared Fureman
*Assistant Examiner* — Lucy Thomas
(74) *Attorney, Agent, or Firm* — Sughrue Mion, PLLC

(57) ABSTRACT

There is provided a protection apparatus for a load circuit, capable of protecting the load circuit by simulating a fuse. A pseudo heat capacity $Cth^*$ smaller than a heat capacity of an electric wire used in the load circuit is set, and a temperature of the electric wire is calculated with reference to an arithmetic expression of heat generation amount of the electric wire, an arithmetic expression of heat radiation amount of the electric wire, a time counted by the count unit, and the pseudo heat capacity $Cth^*$. Then, a semiconductor relay S1 is interrupted when the calculated temperature of the electric wire reaches an allowable temperature of the electric wire to protect the load circuit from heat generation.

5 Claims, 4 Drawing Sheets

(56) References Cited

FOREIGN PATENT DOCUMENTS

| JP | 2002-084654 A | 3/2002 |
| JP | 2007-019728 A | 1/2007 |
| JP | 2007-295776 A | 11/2007 |
| JP | 2009-130944 A | 6/2009 |

OTHER PUBLICATIONS

Office Action, dated Oct. 9, 2012, issued by the Japanese Patent Office in counterpart Japanese Patent Application No. 2008-155437.

* cited by examiner

S1: TEMPERATURE OF ELECTRIC WIRE
S2: TEMPERATURE OF ELECTRIC WIRE WHEN Cth IS QUARTERED

PROTECTION APPARATUS FOR LOAD CIRCUIT

TECHNICAL FIELD

The present invention relates to a protection apparatus for a load circuit for interrupting the load circuit immediately to protect the circuit when an overcurrent flows through the load circuit and an electric wire temperature rises.

BACKGROUND ART

A load circuit, which supplies power to a load, such as a lamp or a motor, mounted on a vehicle, includes a battery and an electronic switch (MOSFET, etc.) provided between the battery and the load. The battery, the electronic switch and the load are connected to each other via conductors including electric wires. In the load circuit, a control circuit is provided to turning on and off the electronic switch. The electronic switch is tuned on and off by a drive signal and a stop signal output from the control circuit to switch the load between a drive state and a stop state.

In the load circuit, a fuse is provided to protect the load, the electric wire, the electronic switch, etc. by interrupting the circuit instantaneously when an overcurrent flows through the load. Further, as a current detection circuit having characteristics just equivalent to that of a fuse without using the fuse, a configuration described, for example, in JP-A-2007-19728 (Patent Literature 1) is known.

In a configuration adopted by Patent Literature 1, a current having a magnitude proportional to a current flowing through a power MOSFET used as the electronic switch for driving the load is generated, and the circuit is interrupted when the current exceeds a predetermined threshold current and a voltage produced in an RC circuit formed by a resistor and a capacitor reaches a predetermined threshold voltage.

Citation List

Patent Literature
  Patent Literature 1: JP-A-2007-19728

SUMMARY OF INVENTION

Technical Problem

In the conventional example described in Patent Literature 1, however, the configuration in which the circuit is interrupted when the overcurrent flows through the load is adopted. Since an actual electric wire temperature is not calculated, it is impossible to obtain interruption characteristics which simulate the existing fuse while protecting the circuit if the overcurrent occurs. The fuse provided in the load circuit does not interrupt the circuit by detecting the overcurrent, but does interrupt the load circuit by fusing due to the heat generation occurred when the overcurrent occurs. Thus, it is never said that the apparatus described in Patent Literature 1 does faithfully simulate the characteristics of the fuse. Further, since there is a problem of deterioration in the fuse, diameter of an electric wire must be large in light of the deterioration.

The present invention is to solve the existing problem, and its object is to provide a protection apparatus for a load circuit, capable of protecting the load circuit by simulating a fuse more faithfully.

Solution to Problem

In order to achieve the object, the present invention provides a protection apparatus for a load circuit, which protects the load circuit when a temperature of an electric wire rises in the load circuit which supplies a power output from a power supply to a load to drive the load, the protection apparatus comprising: a count unit which is adapted to count an elapsed time; a current detection unit which is adapted to detect a current flowing through the electric wire of the load circuit; a switch unit which is adapted to switch between connection and interruption of the load circuit; a temperature calculation unit which is adapted to set a pseudo heat capacity smaller than a heat capacity of the electric wire used in the load circuit, and to calculate the temperature of the electric wire with reference to an arithmetic expression of heat generation amount of the electric wire, an arithmetic expression of heat radiation amount of the electric wire, the time counted by the count unit, and the pseudo heat capacity; and an interruption control unit which is adapted to interrupt the switch unit when the temperature of the electric wire calculated by the temperature calculation unit reaches an allowable temperature of the electric wire.

In a preferred aspect, if the current detected by the current detection unit is expressed by I, the arithmetic expression of heat generation amount is expressed by the following expression:

$$\text{(heat generation amount)} = I2 \times Ron \times \Delta t;$$

where Ron indicates an electric resistance per unit length of the electric wire, and $\Delta t$ indicates a sampling time.

In a preferred aspect, the arithmetic expression of heat radiation amount is expressed by the following expression:

$$\text{(heat radiation amount)} = Q/(Cth^* \times Rth/\Delta t);$$

where $Cth^*$ indicates a pseudo heat capacity per unit length of the electric wire, Rth indicates a heat resistance per unit length of the electric wire, $\Delta t$ indicates a sampling time, and Q indicates a heat amount per unit length of the electric wire, and a value obtained by multiplying the temperature of the electric wire by the pseudo heat capacity $Cth^*$.

In a preferred aspect, the interruption control unit calculates a temperature Tn at present on the basis of a temperature Tp of the electric wire calculated in a previous sampling time, the heat generation amount, the heat radiation amount, and the pseudo heat capacity $Cth^*$ by the following expression:

$$Tn = Tp + \text{(heat generation amount} - \text{heat radiation amount)}/Cth^*.$$

Further, in a calculation method of the pseudo heat capacity $Cth^*$ used in the protection apparatus for the load circuit according to the invention, by the following steps:

(i) carrying a current through a fuse having desired fusing characteristics to acquire current/time characteristics data indicating a relationship between a conducting current and a fusing time;

(ii) calculating a maximum current Imax which can be continuously conducted through the fuse from the current/time characteristics data;

(iii) calculating a temperature threshold $\Delta Tmax$ at the time of continuously conducting the maximum current Imax through a downstream electric wire of a protection circuit by the following expression:

$$\Delta Tmax = Rth \times Ron \times Imax2;$$

where Rth indicates a heat resistance per unit length of the electric wire, and Ron indicates an electric resistance per unit length of the electric wire; and (iv) calculating the pseudo heat capacity $Cth^*$ by the following expression as a function of the temperature threshold $\Delta Tmax$:

$$C_{th}^* = \frac{-t}{R_{th}\ln\left(1 - \frac{\Delta T_{max}}{R_{th}R_{on}I^2}\right)}, \quad \text{[Expression 1]}$$

the calculation method calculates the pseudo heat capacity Cth*.

Advantageous Effects of Invention

According to the invention, as the actual heat capacity Cth of the electrical wire, using the pseudo heat capacity Cth* smaller than it, the heat generation amount and the heat radiation amount of the electric wire are calculated and the temperature of the electric wire is calculated. The switch unit is interrupted in a case where the calculated temperature reaches the allowable temperature of the electric wire. Since the load circuit can be stopped before the actual temperature of the electric wire reaches the allowable temperature, the electric wire and the constituent elements of the load circuit can be protected from the heat generation.

In addition, according to the invention, the pseudo heat capacity Cth* can be calculated to obtain the fusing characteristics just equivalent to the characteristics of a generally-used fuse used to protect an electric wire connected to the load circuit. Thus, the overcurrent protection which simulates the fuse can be performed.

DESCRIPTION OF EMBODIMENTS

Figure 1:
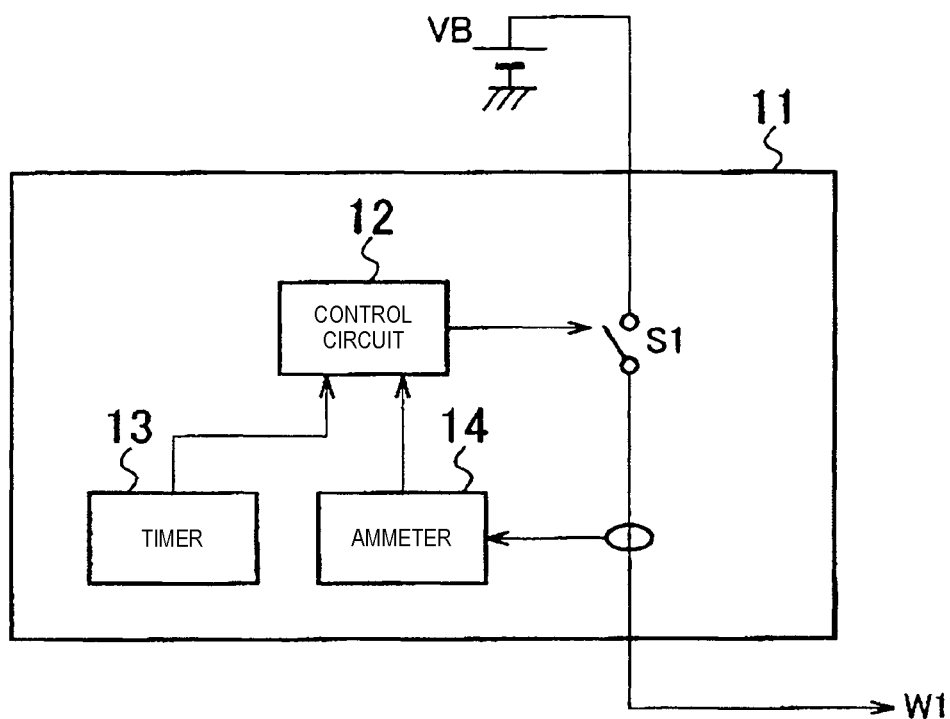
FIG. 1 is a block diagram showing a configuration of a protection apparatus for a load circuit according to an embodiment of the invention.

A description is made of an embodiment of the present invention with reference to drawings. FIG. 1 is a block diagram showing a configuration of a protection apparatus 11 for a load circuit according to an embodiment of the invention. As shown in the figure, the protection apparatus 11 for the load circuit includes a semiconductor relay S1 (a switch unit) connected to a battery VB, an ammeter 14 which detects a current flowing through an electric wire W1, a timer (a count unit) 13 which counts an elapsed time for flowing the current, and a control circuit 12 which controls turning on and off the semiconductor relay S1 on the basis of the current value detected by the ammeter 14 and the time counted by the timer 13.

In the protection apparatus 11 for the load circuit according to the embodiment, a temperature of the electric wire W1 is calculated by the control circuit (a temperature calculation unit, an interruption control unit) 12 using a method (a method of calculating the temperature of the electric wire using "a pseudo heat capacity Cth*") described below. When the temperature of the electric wire W1 reaches a fusing temperature of a fuse which is usually provided to the electric wire W1, the semiconductor relay S1 provided on an upstream of the electric wire W1 is interrupted to protect the electric wire W1 and circuit-constituent elements such as a load provided on a downstream of the electric wire W1. Note that the protection apparatus 11 for the load circuit is configured by a microcomputer, for example.

Figure 2:
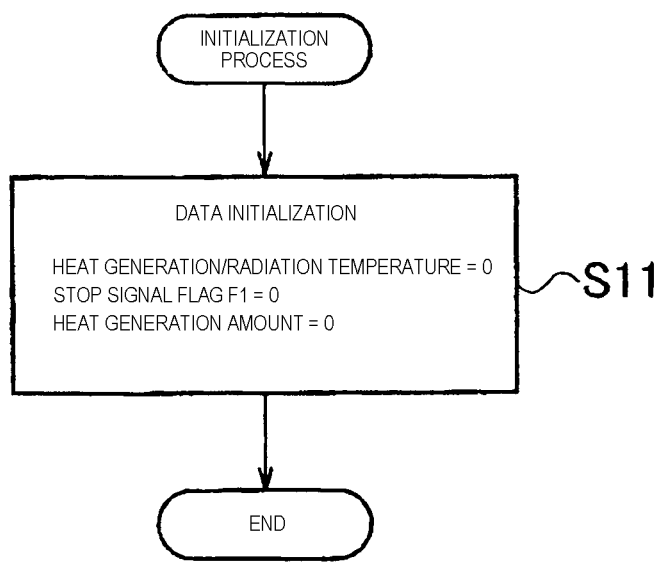
FIG. 2 is a flowchart showing an initialization process of the protection apparatus for the load circuit according to the embodiment of the invention.

Next, an operation of the protection apparatus 11 for the load circuit is described with reference to flowcharts shown in FIG. 2 and FIG. 3. FIG. 2 is a flowchart showing steps of an initialization process in the control circuit 12. The initialization process is carried out when an anomaly determination process of the temperature of the electric wire starts. That is, all of heat generation/radiation temperature data, stop signal flag F1, and heat generation amount data which are used in the anomaly determination process of the temperature of the electric wire shown in FIG. 3 are reset to zero (step S11).

Figure 3:
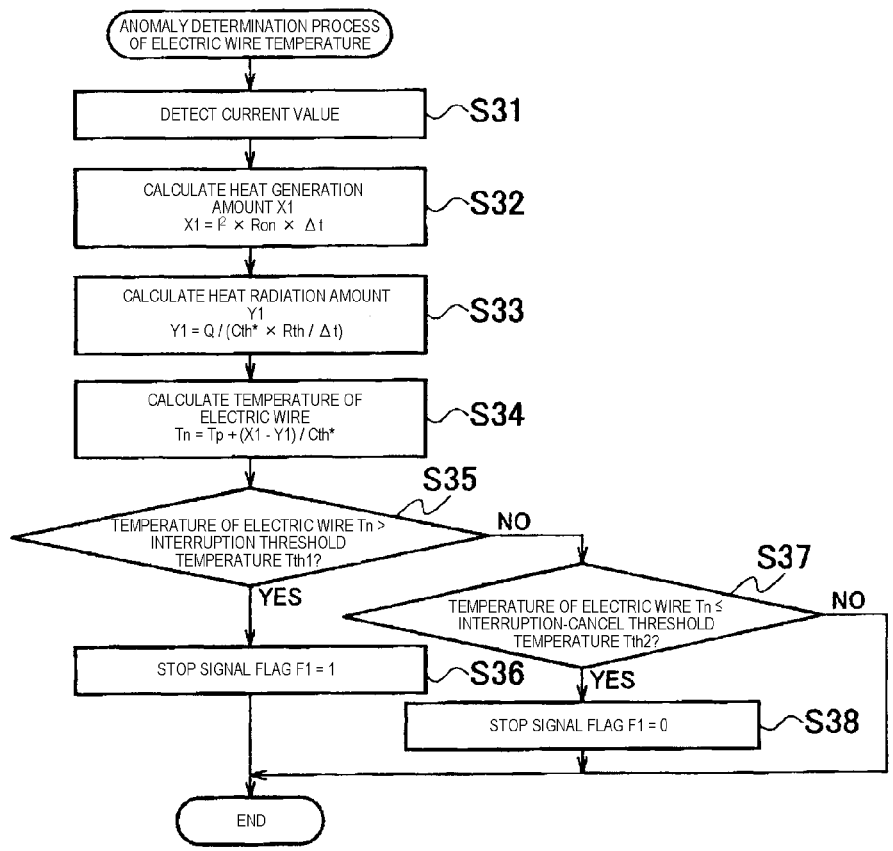
FIG. 3 is a flowchart showing an anomaly determination process of an electric wire temperature of the protection apparatus for the load circuit according to the embodiment of the invention.

FIG. 3 is a flowchart showing steps of an anomaly determination process of the electric wire temperature. When the semiconductor relay S1 shown in FIG. 1 is turned on to apply a current through the electric wire W1, a conducting current is detected by the ammeter 14, and the control circuit 12 obtains the detected current I (step S31).

Then, when the current flows, the control circuit 12 calculates a heat generation amount X1 per unit length of the electric wire on the basis of the current I detected by the ammeter 14 using the following expression (1).

$$X1 = I^2 \times Ron \times \Delta t \quad (1)$$

In the expression (1), "Ron" indicates an electric resistance per unit length of the electric wire, and $\Delta t$ indicates a sampling time (5 [msec], for instance).

The control circuit 12 also calculates a heat radiation amount Y1 of the electric wire using the following expression (2).

$$Y1 = Q/(Cth^* \times Rth/\Delta t) \quad (2)$$

In the expression (2), "Cth*" indicates a pseudo heat capacity per unit length of the electric wire (details are described later), "Rth" indicates a heat resistance per unit length of the electric wire, $\Delta t$ indicates a sampling time (5 [msec], for instance), and Q indicates a heat amount per unit length of the electric wire, and a value obtained by multiplying the temperature of the electric wire by the pseudo heat capacity Cth*.

Then, the control circuit 12 calculates an electric wire temperature Tn at the time of present-measuring on the basis of an electric wire temperature Tp at the time of previous-measuring using the following expression (3).

$$Tn = Tp + (X1 - Y1)/Cth^* \quad (3)$$

Accordingly, every time the sampling time $\Delta t$ elapses, the heat generation temperature is added or the heat radiation temperature is subtracted sequentially to/from the electric wire temperature at the time of previous-measuring (initially, Tp is a peripheral temperature) to calculate the electric wire temperature at the time of present-measuring.

Next, the control circuit 12 compares the electric wire temperature Tn calculated by the process of step S34 with a preset interruption threshold temperature Tth1 (150° C., for instance) (step S35). If Tn>Tth1 is satisfied (YES in step S35), the stop signal flag F1=1 is assigned (step S36). If the stop signal flag F1=1 is assigned, the control circuit 12 turns off the semiconductor relay S1 shown in FIG. 1 to interrupt the load circuit. In addition, if the stop signal flag F1=1 is assigned, it is interlocked so as not to turn on the semiconductor relay S1 even if a turn-on operation to the semiconductor relay S1 is input by an external operation, etc.

On the other hand, the relationship between the electric wire temperature Tn and the interruption threshold temperature Tth1 does not become Tn>Tth1 (NO in step S35), the control circuit 12 compares the electric wire temperature Tn with a preset interruption-cancel threshold temperature Tth2 (Tth2<Tth1; Tth2 is 50° C., for instance) (step S37). If Tn≤Tth2 is satisfied (YES in step S37), the stop signal flag F1=0 is assigned (step S38). Accordingly, the interlock is canceled, and it becomes possible to turn on the semiconductor relay S1 if the turn-on operation to the semiconductor relay S1 is input next time.

In this way, the change in electric wire temperature due to the heat generation or the heat radiation is accumulated for each predetermined sampling time Δt. If the electric wire temperature Tn at the time of present-measuring exceeds the interruption threshold temperature Tth1, the stop signal flag F1=1 is assigned. Thus, the semiconductor relay S1 is turned off to interrupt the circuit, and also an off-state of the semiconductor relay S1 is maintained until the electric wire temperature Tn is dropped to the interruption-cancel threshold temperature Tth2 or lower.

Figure 4:
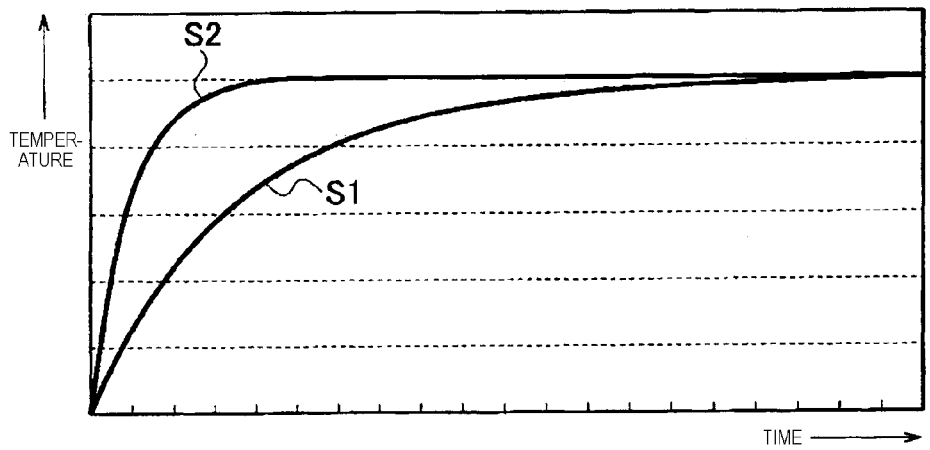
FIG. 4 is a characteristics graph showing a relationship between a conducting time and an electric wire temperature.

Next, a method of calculating the pseudo heat capacity Cth* is described. FIG. 4 is a characteristics graph showing an elapsed time and a change in electric wire temperature since a predetermined current flows through the electric wire continuously. It is generally known that an electric wire temperature T2 when the current continues to flow through the electric wire is expressed by the following expression (4).

$$T2=T1+I^2 \times Ron \times Rth\{1-\exp(-t/Cth \cdot Rth)\} \quad (4)$$

In the expression (4), T1 indicates a peripheral temperature, "I" indicates a conducting current, "Ron" indicates an electric resistance per unit length of the electric wire, "Rth" indicates a heat resistance per unit length of the electric wire, "Cth" indicates a heat capacity per unit length of the electric wire, and "t" indicates an elapsed time.

Accordingly, the temperature of the electric wire is changed as shown by a curving line S1 in FIG. 4 on the basis the expression (4). Here, if the heat capacity Cth of the electric wire is modified to the heat capacity Cth* (pseudo heat capacity) having a quarter value of Cth (i.e. the heat capacity is reduced), the temperature of the electric wire is changed as shown by a curving line S2 in FIG. 4. As apparent from the curving lines S1, S2, if the heat capacity Cth is modified to a smaller value, the electric wire temperature rises earlier with respect to the time, and reaches a saturated temperature. In other words, when the temperature of the electric wire is calculated by modifying the actual heat capacity Cth of the electric wire to the pseudo heat capacity Cth* smaller than the heat capacity Cth, the higher temperature than the actual electric wire temperature is calculated until the temperature reaches the saturated temperature. This means, it possible to interrupt the circuit before the temperature actually reaches a smoking-producing temperature of the electric wire if the smoking-producing temperature is set as the threshold temperature to interrupt the load circuit.

Figure 5:
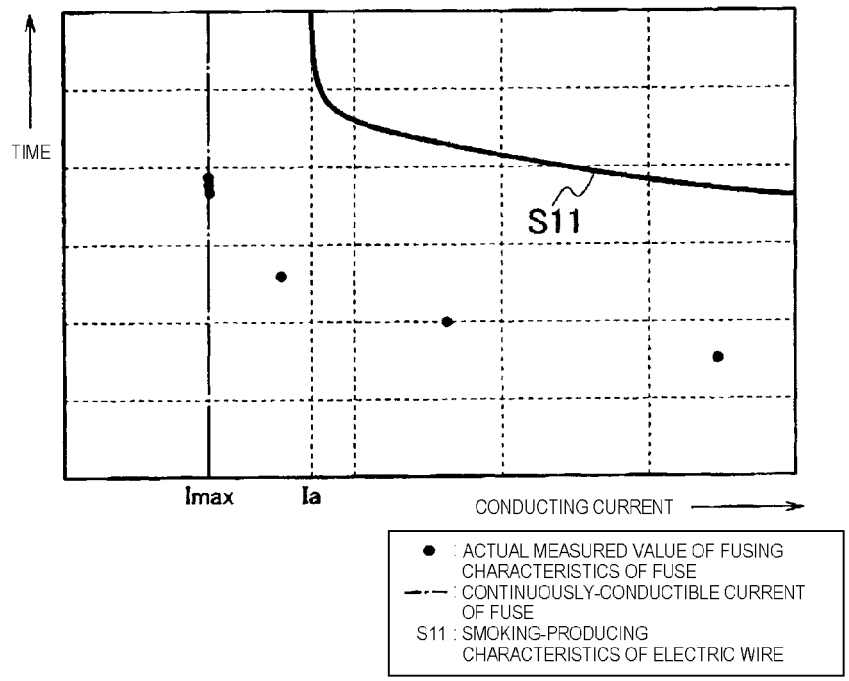
FIG. 5 is a characteristics graph showing smoking-producing characteristics of the electric wire used in the load circuit and actual measured values of fusing characteristics of a fuse in the protection apparatus for the load circuit according to the embodiment of the invention.
Figure 6:
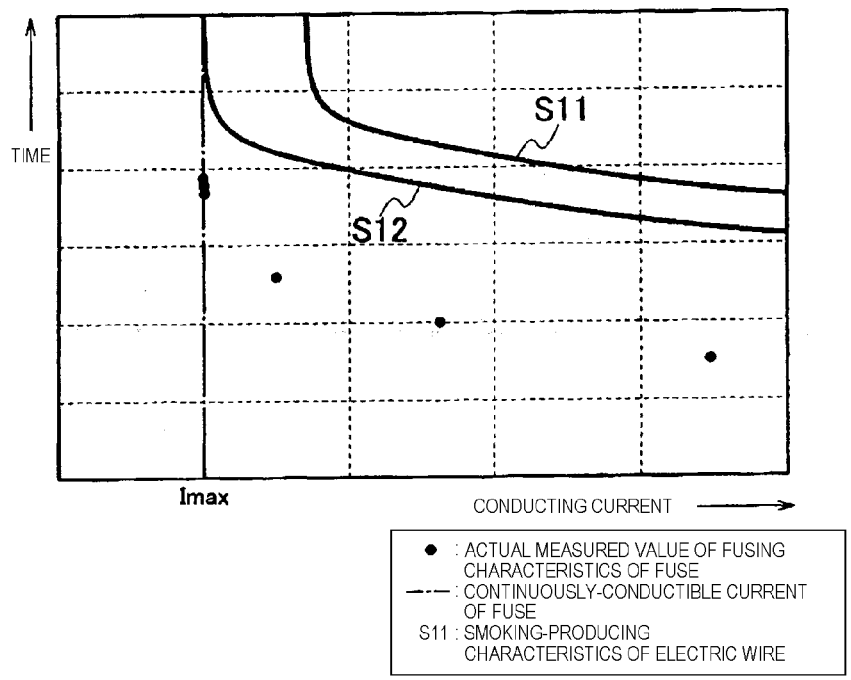
FIG. 6 is a characteristics graph showing smoking-producing characteristics of the electric wire through which a current equivalent to a continuously-conductible current of the fuse can be continuously conducted in the protection apparatus for the load circuit according to the embodiment of the invention.
Figure 7:
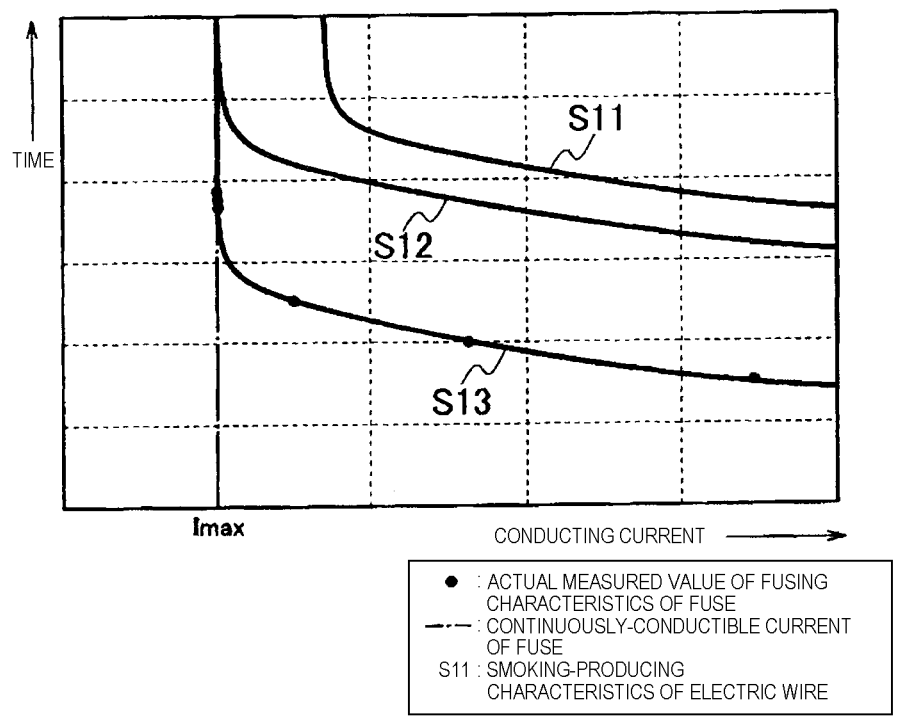
FIG. 7 is a characteristics graph showing smoking-producing characteristics in which the fusing characteristics of the fuse is simulated in the protection apparatus for the load circuit according to the embodiment of the invention.

FIGS. 5 to 7 are characteristics graphs showing the relationship between conducting current and conducting time for describing steps until the determination of the pseudo heat capacity Cth*. A curving line S11 shown in FIG. 5 is a characteristics graph showing smoking-producing characteristics of the electric wire when a horizontal axis indicates a current, and a vertical axis indicates a time (logarithmic scale). The characteristics graph is calculated by calculating a time t until the temperature T2 becomes the smoking-producing temperature (150° C., for instance) of the electric wire in the current I of the expression (4). It is found from the curving line S11 that the temperature reaches the smoking-producing temperature in a shorter time as the conducting current becomes larger, and if the conducting current is smaller than Ia, the electric wire does not reach the smoking-producing temperature even if the current flows continuously. In the present embodiment, a current is actually applied to a fuse of a specification which is generally used with respect to the electric wire to investigate characteristics of the fuse. As a result, measured values of fusing characteristics (current/time characteristics data) of the fuse shown by circles in FIG. 5 can be obtained, for example. Then, a continuously-conductible current Imax of the fuse can be calculated from the measured values of fusing characteristics shown in FIG. 5.

Next, a temperature threshold ΔTmax is calculated on the basis of the continuously-conductible current Imax calculated by the above process by the following expression (5).

$$\Delta Tmax = Rth \times Ron \times Imax^2 \quad (5)$$

Here, the temperature threshold ΔTmax indicates an upper limit of a raising temperature ΔT with respect to the peripheral temperature. If the load circuit is interrupted when the raising temperature ΔT exceeds ΔTmax, it becomes possible to interrupt the load circuit by the characteristics just equivalent to that of the fuse. An expression in which T2−T1=ΔT is assigned to the above expression (4) is regarded as the expression (4') as follows.

$$\Delta T = I^2 \times Ron \times Rth\{1-\exp(-t/Cth \cdot Rth)\} \quad (4')$$

Then, the current "I" in the expression (4') is arbitrarily changed, the elapsed time "t" is increased for each current "I", and the time at which the raising temperature ΔT reaches the temperature threshold ΔTmax is plotted. Then, a characteristics curving line shown by S12 in FIG. 6 is obtained.

Further, by substituting the value of the temperature threshold ΔTmax calculated by the expression (5) into ΔT of the expression (4'), by transforming the expression so that left-hand side becomes the heat capacity Cth, and by updating the heat capacity Cth to the pseudo heat capacity Cth*, the following expression (6) is obtained.

[Expression 2]

$$C_{th}^* = \frac{-t}{R_{th} \ln\left(1 - \frac{\Delta T_{max}}{R_{th} R_{on} I^2}\right)}, \quad (6)$$

Then, when the current "I" and the time "t" (point indicated by the circle) corresponding to the fusing characteristics measure value of the fuse (current/time characteristics data) shown in FIG. 5 and FIG. 6 are substituted into the expression (6), a nearly-constant pseudo heat capacity Cth* is obtained. The smoking-producing characteristics of the electric wire using the pseudo heat capacity Cth* is indicated by the curving line as shown by S13 in FIG. 7, and it is said that the fusing characteristics of the fuse is almost simulated faithfully.

In the embodiment, the calculation of the expressions (1) to (3) is carried out using the pseudo heat capacity Cth* calculated by the expression (6). Thus, it is possible to protect the load circuit by the temperature characteristics in which the fuse is simulated between the fuse and the electric wire conductive capability.

In this way, in the protection apparatus for the load circuit according to the embodiment, when the electric wire temperature Tn is calculated based on the heat generation temperature and the heat radiation temperature of the electric wire at the sampling time Δt, the pseudo heat capacity Cth* which is set at a value smaller than that of the actual heat capacity Cth of the electric wire is used. Accordingly, it is possible to interrupt the load circuit by the temperature characteristics which simulate the fusing characteristics of the fuse.

Accordingly, it is unnecessary to use the fuse as usual. Therefore, the deterioration occurred in the fuse as usual due to the inrush current and the repeat of turning on/off the load does not occur, and it is not necessary to select the fuse having a margin. Thus, the diameter of the electric wire can be miniaturized and the miniaturization and the lightweight of the electric wire are accomplished. And eventually, the advantageous effect of the improvement of the fuel efficiency can be achieved.

Further, in the fuse used as usual, the predetermined current value has been set such as 5 [A], 7.5 [A], 10 [A], 15 [A], or 20 [A] . . . , but in the protection apparatus for the load circuit according to the embodiment, an arbitrary current value such as 6 [A] or 12.5 [A] can be set by arbitrarily setting the pseudo heat capacity Cth*. Thus, it helps thinning of the diameter of the electric wire.

The description has been made of the protection apparatus for the load circuit according to the invention on the basis of the embodiment as shown in figures. However, the invention is not limited thereto, and the architecture of each part may be substituted by any architecture having a similar function. For example, although the load circuit mounted on the vehicle has been described as an example in the embodiment, the invention is not limited thereto, and alternatively, it may be applied to the other type of the load circuit.

Industrial Applicability

It is extremely useful for protecting the electric wire without using the fuse used in the load circuit.

Reference Signs List

11: Protection apparatus for load circuit, 12: Control circuit (Temperature calculation unit, Interruption control unit), 13: Timer, 14: Ammeter (Current detection unit), S1: Semiconductor relay, VB: Battery (Power supply), W1: Electric wire

The invention claimed is:

1. A protection apparatus for a load circuit, which protects the load circuit when a temperature of an electric wire rises in the load circuit which supplies a power output from a power supply to a load to drive the load, the protection apparatus comprising:
a count unit which is adapted to count an elapsed time;
a current detection unit which is adapted to detect a current flowing through the electric wire of the load circuit;
a switch unit which is adapted to switch between connection and interruption of the load circuit;
a temperature calculation unit which is adapted to set a pseudo heat capacity smaller than a heat capacity of the electric wire used in the load circuit, and to calculate the temperature of the electric wire with reference to an arithmetic expression of heat generation amount of the electric wire, an arithmetic expression of heat radiation amount of the electric wire, the time counted by the count unit, and the pseudo heat capacity; and
an interruption control unit which is adapted to interrupt the switch unit when the temperature of the electric wire calculated by the temperature calculation unit reaches an allowable temperature of the electric wire.

2. The protection apparatus for the load circuit according to claim 1, wherein
if the current detected by the current detection unit is expressed by I, the arithmetic expression of heat generation amount is expressed by the following expression:

(heat generation amount)=$I^2 \times Ron \times \Delta t$;

where Ron indicates an electric resistance per unit length of the electric wire, and Δt indicates a sampling time.

3. The protection apparatus for the load circuit according to claim 1, wherein
the arithmetic expression of heat radiation amount is expressed by the following expression:

(heat radiation amount)=$Q/(Cth^* \times Rth/\Delta t)$;

where Cth* indicates a pseudo heat capacity per unit length of the electric wire, Rth indicates a heat resistance per unit length of the electric wire, Δt indicates a sampling time, and Q indicates a heat amount per unit length of the electric wire, and a value obtained by multiplying the temperature of the electric wire by the pseudo heat capacity Cth*.

4. The protection apparatus for the load circuit according to claim 1, wherein
the interruption control unit calculates a temperature Tn at present on the basis of a temperature Tp of the electric wire calculated in a previous sampling time, the heat generation amount, the heat radiation amount, and the pseudo heat capacity Cth* by the following expression:

Tn=Tp+(heat generation amount−heat radiation amount)/$Cth^*$.

5. A calculation method of the pseudo heat capacity Cth* used in the protection apparatus for the load circuit as set forth in claim 1, the calculation method calculating the pseudo heat capacity Cth* by the following steps:
(i) carrying a current through a fuse having desired fusing characteristics to acquire current/time characteristics data indicating a relationship between a conducting current and a fusing time;
(ii) calculating a maximum current Imax which can be continuously conducted through the fuse from the current/time characteristics data;
(iii) calculating a temperature threshold ΔTmax at the time of continuously conducting the maximum current Imax through a downstream electric wire of a protection circuit by the following expression:

$\Delta Tmax = Rth \times Ron \times Imax^2$;

where Rth indicates a heat resistance per unit length of the electric wire, and Ron indicates an electric resistance per unit length of the electric wire; and
(iv) calculating the pseudo heat capacity Cth* by the following expression as a function of the temperature threshold ΔTmax:

$$C_{th}^* = \frac{-t}{R_{th} \ln\left(1 - \frac{\Delta T_{max}}{R_{th} R_{on} I^2}\right)}.$$ [Expression 1]

* * * * *